(12) United States Patent
Song et al.

(10) Patent No.: US 8,930,339 B2
(45) Date of Patent: Jan. 6, 2015

(54) SEARCH ENGINE PERFORMANCE EVALUATION USING A TASK-BASED ASSESSMENT METRIC

(75) Inventors: Yang Song, Kirkland, WA (US); Zhen Liao, Beijing (CN); Liwei He, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 63 days.

(21) Appl. No.: 13/342,354

(22) Filed: Jan. 3, 2012

(65) Prior Publication Data

US 2013/0173573 A1    Jul. 4, 2013

(51) Int. Cl.
G06F 7/00 (2006.01)
G06F 17/30 (2006.01)

(52) U.S. Cl.
USPC ............................. 707/706; 707/723; 707/732

(58) Field of Classification Search
CPC ........................... G06F 17/30867; G06F 17/30
USPC ......................................................... 707/706
See application file for complete search history.

(56) References Cited

U.S. PATENT DOCUMENTS

| | | | |
|---|---|---|---|
| 7,031,961 B2 | 4/2006 | Pitkow | |
| 7,584,181 B2 | 9/2009 | Zeng et al. | |
| 8,260,777 B1 * | 9/2012 | Manber | 707/731 |
| 2006/0248059 A1 * | 11/2006 | Chi et al. | 707/3 |
| 2007/0239680 A1 * | 10/2007 | Oztekin et al. | 707/3 |
| 2008/0027913 A1 * | 1/2008 | Chang et al. | 707/3 |
| 2008/0189281 A1 | 8/2008 | Cancel et al. | |
| 2008/0189408 A1 * | 8/2008 | Cancel et al. | 709/224 |
| 2008/0301090 A1 * | 12/2008 | Sadagopan et al. | 707/3 |
| 2009/0077033 A1 * | 3/2009 | McGary et al. | 707/3 |
| 2009/0157653 A1 * | 6/2009 | Herlocker et al. | 707/5 |
| 2010/0030722 A1 * | 2/2010 | Goodson et al. | 706/54 |
| 2010/0030894 A1 * | 2/2010 | Cancel et al. | 709/224 |
| 2010/0100443 A1 | 4/2010 | Hoashi et al. | |
| 2010/0312786 A1 * | 12/2010 | Wai | 707/769 |
| 2011/0154216 A1 * | 6/2011 | Aritsuka et al. | 715/745 |
| 2012/0109924 A1 * | 5/2012 | Jones et al. | 707/706 |
| 2013/0006952 A1 * | 1/2013 | Wong et al. | 707/706 |

FOREIGN PATENT DOCUMENTS

| | | | |
|---|---|---|---|
| KR | 10-2002-0038966 A | 5/2002 | |
| KR | 10-2009-0000284 A | 1/2009 | |

OTHER PUBLICATIONS

David hawking, "Measuring Search Engine Quality", 2001.*
Cao, et al., "FacetAtlas: Multifaceted Visualization for Rich Text Corpora", In IEEE Transactions on Visualization and Computer Graphics, vol. 16, Issue 6, Nov.-Dec. 2010, 10 pages.

(Continued)

Primary Examiner — Binh V Ho
(74) Attorney, Agent, or Firm — Dan Choi; Doug Barker; Micky Minhas (57) ABSTRACT

The subject disclosure is directed towards evaluating search engine implementation performance using a task-based assessment metric. Logged user activities associated with the search engine implementation are processed into sessions and atomic events corresponding to the user activities within the sessions. The atomic events corresponding to the user activities are classified into tasks based on similarity of the queries within the user activities. After applying the task-based assessment metric to task information associated with the search engine implementation, an evaluation mechanism determines indicia of search engine implementation performance in terms of user behavior.

19 Claims, 9 Drawing Sheets

(56) References Cited

OTHER PUBLICATIONS

Aula, et al., "How does Search Behavior Change as Search Becomes More Difficult?", In Proceedings of the 28th International Conference on Human Factors in Computing Systems, Apr. 10-15, 2010, 10 pages.

Lorigo, et al, "Eye Tracking and Online Search: Lessons Learned and Challenges Ahead", In Journal of the American Society for Information Science and Technology, vol. 59, Issue 7, Mar. 14, 2008, 12 pages.

Torres, et al., "An Analysis of Queries Intended to Search Information for Children", In Proceeding of the Third Symposium on Information Interaction in Context, Aug. 18-21, 2010, 10 pages.

Simko, et al., "Semantic History Map: Graphs Aiding Web Revisitation Support", In Proceedings of International Workshops on Database and Expert Systems Applications, Aug. 30-Sep. 3, 2010, 5 pages.

Hu, et al., "Effects of Search Success on Search Engine Re-Use", In Proceedings of 20th ACM International Conference on Information and Knowledge Management, Oct. 24-28, 2011, 6 pages.

Lucchese, et al., "Identifying Task-based Sessions in Search Engine Query Logs", In Proceedings of the Fourth ACM International Conference on Web Search and Data Mining, Feb. 9-12, 2011, 10 pages.

International Search Report and Written Opinion for PCT/US2013/020110 mailed Apr. 10, 2013, 9 pages.

* cited by examiner

SEARCH ENGINE PERFORMANCE EVALUATION USING A TASK-BASED ASSESSMENT METRIC

BACKGROUND

Commercial search engine providers (e.g., Microsoft® Bing™) analyze submitted queries and respond with suggested web pages that relevant and useful. In order to quickly and continuously improve search engine experience, these providers mine the data from millions of participating users who submit queries, initiate searches and select web pages on search results. By mining informational needs from logged user search histories and browsing histories, the search engine providers are able to analyze current search engine performance and enhance future search result quality with improved techniques for mapping topics to queries, locating matching documents, displaying the documents on a search result page and so forth.

During a search process, the user may issue a series of queries and click several web page URLs in order to locate desired information. Therefore, evaluating search engine performance based on single query does not provide enough insight into user logic and other issues related to the search engine experience. In addition, the search engine providers employ various techniques for analyzing the search and browsing histories, but these techniques do not capture enough details regarding the search engine experience. Essentially, because the search engine providers are unable to accurately model user behavior during the search engine experience, these providers cannot substantially improve the search engines. The providers desire techniques that holistically analyze search engine performance for the purpose of creating search engines that produce more useful and relevant search results.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards evaluating search engine performance using a task-based assessment metric. In one aspect, the search engine implementation (i.e., version) performance may be described in terms of user behavior by evaluating each task (e.g., a set of user-related search activities that may be known as atomic events, such as a user queries and clicks) in accordance with the task-based assessment metric. After applying the task-based assessment metric to the tasks, an evaluation mechanism may determine indicia of the search engine implementation performance. In one aspect, the indicia may include various test statistics differentiating the search engine implementation performance from a performance benchmark.

In another aspect, the evaluation mechanism extracts first sets of tasks from a sample dataset for a first search engine implementation and second sets of tasks from another sample dataset for the second search engine implementation. Each sample dataset may include data from user activity logs. The evaluation mechanism applies the task-based assessment metric to the first sets of tasks and the second sets of tasks to produce a first distribution and a second distribution, respectively. In order to differentiate the first search engine implementation and the second search engine implementation, the evaluation mechanism computes a performance difference between the first distribution and the second distribution.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a task-based evaluation mechanism for producing information or indicia differentiating a search engine implementation from one or more other search engine implementations and/or a performance benchmark based on performance. Such information or indicia may be defined in terms of user behavior, such as user interaction or user engagement. In one implementation, the information or indicia may model qualitative human response to search results provided by the search engine implementation.

The performance benchmark may include a statistical distribution, or any other mathematical performance measure, of a sampling of user activities that are evaluated using a non-task based assessment metric. As an example, the non-task based assessment metric may employ session-based measurements for the user activities. Such a statistical distribution may pertain to the user activities associated with an experimental search engine implementation or a standard search engine implementation against which the search engine implementation performance difference is determined.

In one implementation, the evaluation mechanism uses an evaluation classifier to identify one or more queries associated with each task for each session of a user activity log. The evaluation classifier may be trained to obtain weights assigned to various features of query pairs, such as temporal, semantic, edit distances and/or the like. In one implementation, the evaluation classifier clusters or groups related atomic events into tasks corresponding to user activities associated with the search engine implementation. The evaluation mechanism selects a task-based assessment metric (e.g., a mathematical function or standard for quantifying various features from tasks and other user activities) for quantifying user interactions with the search engine implementation, such as a user satisfaction metric and a user engagement metric, and analyzing the search engine implementation performance with respect to the tasks.

The evaluation mechanism may extract various sample datasets from the user activity log in which each dataset comprises sets of tasks performed by a group of users of a particular search engine implementation. After applying the user satisfaction metric and/or the user engagement metric to sample datasets and producing task-based performance measures, such as a statistical distribution, representing search engine implementation performances, the evaluation mechanism computes test statistics between different pairs of the task-based performance measures and/or certain ones of the task-based performance measures with the performance benchmark.

In one implementation, the evaluation mechanism computes the test statistics indicating a performance difference between a first search engine implementation and a second search engine implementation in terms of the task-based assessment metric and/or the performance benchmark assessment metric.

In another implementation, the evaluation mechanism compares the test statistics with a significance level to determine whether the performance difference is statistically significant (i.e., statistically different). If a p-value of a particular test statistic is lower than a probability of the significance level, the performance difference between different search engine implementations is significant. If the p-value of associated with the task-based assessment metric is lower than a p-value associated with the performance benchmark assessment metric, such a difference may indicate that the task-based assessment metric is more sensitive to minute performance differences than the performance benchmark assessment metric (e.g., a non-task based assessment metric).

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and search in general.

Figure 1:
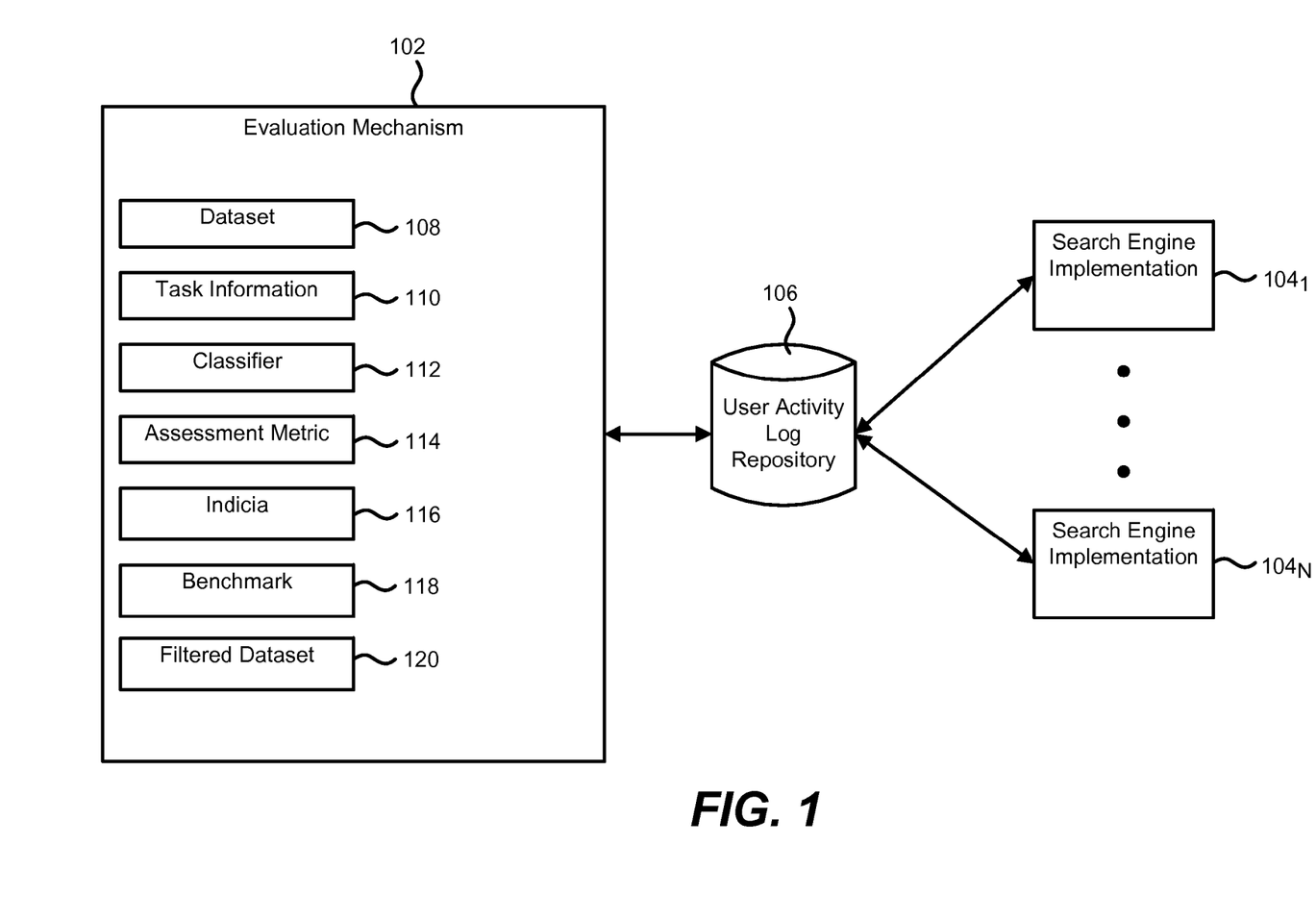
FIG. 1 is a block diagram illustrating an example system for search engine performance evaluation using a task-based assessment metric according to one example implementation.

FIG. 1 is a block diagram illustrating an example system for search engine performance evaluation using a task-based assessment metric according to one example implementation. Various components of the example system may include an evaluation mechanism 102, a plurality of search engine implementations 104 and a user activity log repository 106. FIG. 1 illustrates the plurality of search engine implementations 104 as "a search engine implementation $104_1$ . . . a search engine implementation $104_N$," and, collectively, hereinafter may be referred to as the search engine implementations 104 for simplicity sake. Individually, a single one of the search engine implementations 104 may be referred to as the search engine implementation $104_i$, such as the search engine implementation $104_1$ or the search engine implementation $104_2$, and may represent a specific version of a search engine component that responds to queries from a user component with search results comprising Internet references.

When a particular user submits a query to one of the search engine implementations 104 that is currently acting as the production search engine, the user views returned search results and often select one or more Internet resources (e.g., web pages) to browse and/or display. When a selection is made, an operating system component (e.g., a browser program) and/or a sub-component (e.g., a plug-in) thereof may record such user activities in terms of atomic events. For example, the submitted query and the associated Internet resource selection may be categorized as a search event and a click event, respectively, often referred to as a query-URL pair. Over a period of time, a user activity log is generated that comprises each search event and one or more click events originating from the each search event and communicated to the user activity log repository 106. Alternatively, the search engine implementations 104 and/or an associated mechanism may produce the user activity logs by correlating information within other logs corresponding to each user computer in order to identify query-URL pairs.

The evaluation mechanism 102 may include various components and/or information, such as one or more dataset(s) 108, task information 110, an evaluation classifier 112, an assessment metric 114, indicia 116, a benchmark 118 and a filtered dataset 120. As described herein, each of the dataset(s) 108 may be a sample (dataset) that is generated from a specific user activity log associated with a population of search engine users. It is appreciated that the dataset(s) 108 may include one dataset for evaluating any particular one of the search engine implementations 104 or multiple datasets for comparing two or more of the search engine implementations 104.

The task information 110 may identify each task within the dataset(s) 108. A component of the evaluation mechanism 102 known as the evaluation classifier 112 may extract an example task from a (web) session by clustering one or more related atomic events. In one implementation, the evaluation classifier 112 may define each task as a set of one or more semantically related queries and one or more selected web page URLs that originate from the one or more semantically related queries. Each query constitutes an atomic event known as a search event and each web page URL constitutes another atomic event known as a click event. Two or more search events may be contiguous or may be interleaved within other user activities, such as when an unrelated search or click event exists between two related search/click events. While multitasking, for example, the user may perform more than one web search and view multiple web pages in different browser windows. Similarly, two or more click events may be contiguous or interleaved within the same session.

In one implementation, the assessment metric 114 may be a task-based metric configured to express a feature of user behavior, such as a perspective of search result quality as to relevance (i.e., utility) and/or topic distribution (i.e., similarity). When the assessment metric 114 is applied to a particular task associated with an atomic user informational need, the evaluation mechanism 102 may produce numerical data, such as a numerical value/fact, signifying a qualitative human response to web pages suggested by certain ones of the search engine implementations 104. For example, the evaluation mechanism 102 may determine a number of successful tasks or, equivalently, a task success rate corresponding to each user, which may indicate user satisfaction as to the suggested web pages. As another example, the assessment metric 114 may be a number of tasks (or task quantity) per user, which may indicate user engagement with the suggested web pages or interest in similar or new topics.

After computing the numerical data for each task within the dataset(s) 108, or a portion thereof, in accordance with the assessment metric 114, the evaluation mechanism 102 may produce the indicia 116 of search engine implementation performance in terms of user behavior, such as user satisfaction and/or user engagement. Because the dataset(s) 108 may include a sample of a user population for a specific search engine implementation $104_i$, the indicia 116 may include an estimate of overall user satisfaction and/or user engagement by the entire user population. According to one implementation, the evaluation mechanism 102 aggregates the numerical data for the tasks and builds a (statistical) distribution (e.g., a normal probability distribution) representing the overall user satisfaction and/or the user engagement.

In one implementation, the evaluation mechanism 102 produces the indicia 116 differentiating the specific search engine implementation $104_i$ from other ones of the search engine implementations 104. According to an example implementation, the indicia 116 may include a performance difference, as quantified by the assessment metric 114, between a first search engine implementation $104_1$ and a second search engine implementation $104_N$. The performance difference may refer to a statistical difference (e.g., a variance difference, mean difference or standard error) between a first (probability) distribution associated with the first search engine implementation $104_1$ and a second (probability) distribution associated with the second search engine implementation $104_N$.

In another example implementation, the evaluation mechanism 102 may also determine whether an observed performance difference is statistically significant (may also be referred to as statistically different). For instance, the performance difference may be represented as a test statistic (e.g., a mean score, a proportion, a mean difference, a variance difference, difference between proportions, z-score, t-score, chi-square and/or the like) corresponding to two or more sampling distributions for a test (e.g., two-sided/one-sided two-sample test, such as a Student's test) for which an insignificant or ideal performance difference may be used as a null hypothesis (e.g., a first mean of the first distribution is equal to a second mean of the second distribution). An error occurs in the two-sample test when the null hypothesis is rejected while being true. A significance level refers to a probability of committing the error and denoted by $\alpha$.

A P-value is a probability of observing a sample statistic as extreme as the test statistic having certain degrees of freedom. Hence, a small P-value denotes a very low likelihood of observing a coincidental performance difference (e.g., caused by randomness) between samples that are evaluated with the assessment metric 114. After comparing the P-value to the significance level, if the samples are too extreme, which typically occurs when the P-value is less than the significance level, the null hypothesis is rejected. The samples, therefore, may embody an actual performance difference between different ones of the search engine implementations 104 as perceived by corresponding user populations. Furthermore, the null hypothesis rejection may indicate a level of sensitivity by the assessment metric 114. Whenever the P-value is smaller, the assessment metric 114, in some instances, may be more sensitive to human-search engine interactions and capable of differentiating the search engine implementation 104 using smaller sample sizes.

According to one example mechanism, the evaluation mechanism 102 may use the task information 110 to model various user behavior features in order to facilitate task evaluation. Within one session, for instance, if a click event on a search result answer or advertisement occurred and a dwell time threshold of some predetermined time (e.g., thirty (30) seconds) elapsed or the click event is a last click in a task trail, the evaluation mechanism 102 determines that such a task is successful. A number of tasks or task quantity per user may be another instance of a measurement as to how often one user returns to a corresponding one of the search engine implementations 104 to retrieve desired information and/or submit queries for information that the user finds difficult to locate. The evaluation mechanism 102, typically, may prescribe a session cutoff time threshold of thirty (30) minutes for enumerating the number of tasks per user within a given session. Alternatively, the evaluation mechanism 102 establishes a range of session cutoff time thresholds from one (1) minute to one (1) whole day. For any particular dataset(s) 108, the session cutoff time threshold may be any threshold within such a range. As described herein, the evaluation mechanism 102 may utilize and/or alter the dwell time threshold and/or the session cutoff time threshold when applying the assessment metric 114 and computing test statistics for the dataset(s) 108.

The benchmark 118 may represent a standard by which the evaluation mechanism 102 measures search engine implementation performance with respect to one or more aspects of user behavior, such as user satisfaction or user engagement. According to implementations in which the task-based assessment metric 114 is applied to one of the search engine implementations 104, comparing a task success rate or a task per user quantity with the benchmark 118 may indicate a statistically significant performance difference. As an example, an average user may have spent more time searching for information and/or perceived better web page utility/relevance from search results with a particular search engine implementation than an actual (e.g., previous) implementation whose performance conforms to the benchmark 118. Conversely, the average user may have spent less time using the particular search engine implementation and/or perceived lower web page utility as another example.

By way of example, the user activity log repository 106 stores various recorded data for a plurality of search engine users including browsing histories and search histories (i.e., logs). The operating system components on the user computers may provide the browsing histories. An example browsing history may include an Internet Protocol (IP) address or Uniform Resource Locator (URL), various settings (e.g., market and language settings), time data (i.e., time stamp) and/or the like for one or more web pages being displayed on a user computer. The search engine implementations 104 may collect the search histories for the plurality of search engine users. An example search history may map each submitted query to one or more web page URL selections. Both the browsing history and the search history may describe user activities associated with web searches, but the browsing history may also include non-web search related user activities, such as viewing a web page marked as a favorite. Entries within both histories may include same or similar fields, such as an anonymous user identifier, a browser portal (i.e., window) identifier, the web page URLs generated during browsing and/or searching, timestamps for the web page URLs and/or the like.

In one implementation, the evaluation mechanism 102 may apply various filtering techniques on the browsing and/or search histories. The evaluation mechanism 102 may remove non-English language search queries and/or web page URLs. The evaluation mechanism 102 may also remove entries associated with no search event (e.g., checking e-mail) or created by web robot programs. The evaluation mechanism 102 may also retain entries that include search events from known commercial search engines (e.g., Microsoft® Bing). The remaining entries may be segregated further in order to perform a comparison between the known commercial search engines or, alternatively, kept together in order to analyze search engine utilization holistically. The filtered browsing history or the filtered search history or a combination of both histories may be used as the user activity logs from which sample datasets and/or tasks are extracted.

The evaluation mechanism 102 may employ various task-related data as criteria for filtering the dataset 108 and creating the filtered dataset 120. A search engine provider may specify the task-related data. In one implementation, the evaluation mechanism 102 may extract tasks having a certain URL/domain name or belonging to a certain semantic concept from the dataset 108. For example, the evaluation mechanism 102 may generate the filtered dataset 120 to include or exclude one or more tasks associated with a frequently-visited website and/or a frequently-submitted query or a portion thereof, as indicated by the user activity logs, for the purpose of analyzing search engine implementation performance in another light. When compared to results corresponding to the dataset(s) 108 or the benchmark 118, such an analysis may indicate a performance difference or impact associated with the filtering criteria (e.g., caused by searching for the frequently-visited website and/or the frequently-submitted query).

The filtering criteria may also affect the sensitivity of the assessment metric 114 in differentiating a first search engine implementation from a second search engine implementation. For example, if the filtered dataset 120 includes a large percentage of tasks in which top ten most popular websites are searched (e.g., queries comprising "hotmail.com"), a task success rate may increase because users frequently found pertinent information at a top of the search results. While the second search engine implementation may be outperformed by the first search engine implementation in general, because the second engine implementation produces a similar set of search results for queries that include the top ten most popular websites, competing task success rates may not be statistically different.

Figure 2:
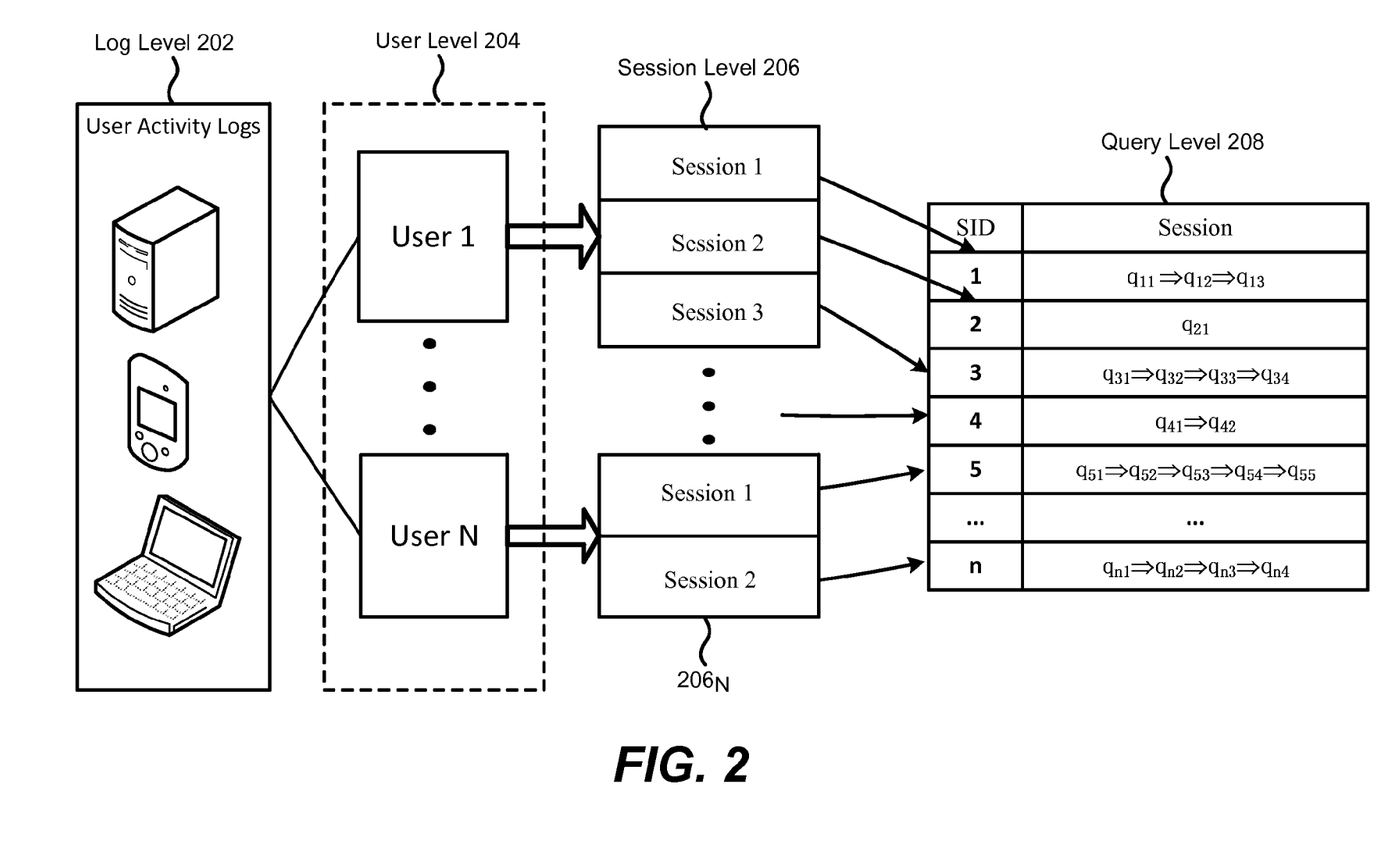
FIG. 2 is a representation of various abstraction levels of user activity on a search engine according to one example implementation.

FIG. 2 is a representation of various abstraction levels of user activity on a search engine according to one example implementation. As illustrated, the various abstraction levels include a (user activity) log level 202, a user level 204, a session level 206 and a query level 208. Each abstraction level represents a partition of a previous abstraction level.

In one implementation, the log level 202 may include an aggregation of various recorded logs/histories, such as browsing histories, from a user population with various maintained logs at commercial search engine servers, such as search histories. The user level 204 may include aggregated log entries for each specific user (illustrated as "user 1" . . . "user N") within the user population. As described herein, while every user may remain anonymous, a unique identifier sequence may be mapped to each user. Each set of aggregated log entries details a specific user's activities (i.e., browsing and/or search activities) with respect to a corresponding search engine implementation.

At the session level 206, such a set may be partitioned into discrete sessions in which two consecutive user activities (search or browsing events) are separated into different sessions if the time interval between these events exceeds a session cutoff time threshold (e.g., thirty minutes). Each of the discrete sessions may be further partitioned into various atomic events, such as query events and click events. As described herein, each session may include one or more tasks associated with a particular informational need to which one or more atomic events are related. For example, the query level 208 depicts a continuous stream of queries for each session ID where two queries may be related but not contiguous, and vice versa. By recognizing two or more related queries and/or one or more click events for web documents in a search results page associated with the two or more related queries, a task may be defined within each session.

Figure 3:
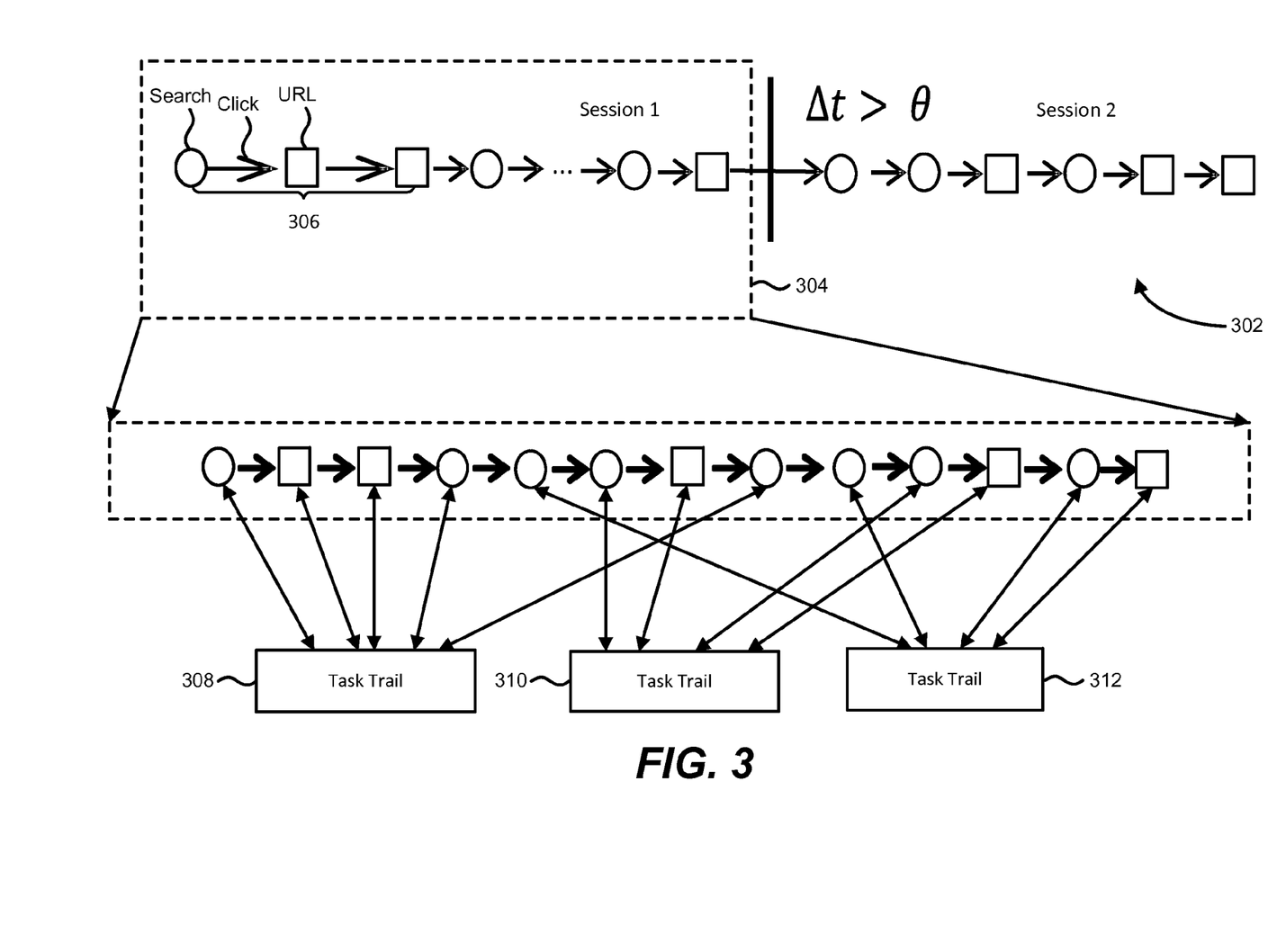
FIG. 3 illustrates task extraction within a partial view of an example session trail according to one example implementation.

FIG. 3 illustrates task extraction within a partial view of an example session trail comprising a sequence of sessions according to one example implementation in which circles represent queries and squares represent page visits. The example session trail may depict user activities 302 as a stream of atomic events that are ordered according to a time at which a user initiated each atomic event. For example, the user may perform a search event by submitting a search query to a search engine (implementation) and perform a click event by selecting/viewing one or more suggested web pages within a search result page and/or navigating to one or more linked web pages from the one or more suggested web pages. As illustrated, a portion of the user activities 302 may be partitioned into one or more sessions including a first session labeled "Session 1" and a second session labeled "Session 2". The moment where the first session transitions into the second session is defined as a session boundary. The session boundary is determined by a session cutoff time threshold "θ" where "Δt>θ" indicates the time interval "Δt" between two consecutive user activities is larger than "θ".

As described herein, the user activities 302 of the example session trail may be described within a sample dataset (e.g., the dataset(s) 108 of FIG. 1), or a filtered subset thereof, associated with a user population of a specific search engine version or implementation. The user activities 302 may include a user activity subset 304 that constitutes at least a portion of the first session. The user activity subset 304 may include one or more atomic events that form a query trail 306. An example definition of the query trail 306 may be a series of atomic events starting with a search event and ending with a last atomic event before a next search query. The series of atomic events may be consecutive or non-consecutive. The last atomic event may be a click event that leads to a document having desired information and indicates an end of a web search because an informational need is met.

FIG. 3 illustrates an enlargement of the user activity subset 304 into task trails that depict a clear ordering of the atomic events associated with each task. As illustrated, some atomic events associated with a same task may be interleaved (i.e., non-contiguous) such that one or more unrelated atomic events may occur in between these atomic events. Various techniques may be employed to classify the atomic events into the task trails, such as a task trail 308, a task trail 310 and a task trail 312. Information associated with the atomic events (e.g., various features extracted from temporal, query words, query logs, and web search results) may be used to measure similarity between each query pair.

In one implementation, various distance/heuristic functions may be applied to temporal, character edit, word, content and/or semantic features and/or training labels to learn weights for computing vector distances indicative of similarity/dissimilarity between two queries. Each function represents a different characterization or metric for determining similarity (e.g., a percentage of same words, a Levenshtein edict distance between two queries with or without stop words, and/or the like). Two queries that are similar may also belong to a same task. Accordingly, the weights are used by an evaluation classifier for identifying queries that belong to the same task. The query pairs are grouped or clustered into one or more tasks. Such a clustering approach may utilize an undirected graph or weighted connected graph in which each vertex is a query and each edge represents similarity. After dropping certain edges and vertices (e.g., having a vector distance below a predefined threshold), each remaining connected sub-graph includes one or more queries belonging to a single task. The clustering approach is repeated until there are no more unassigned queries.

Figure 4:
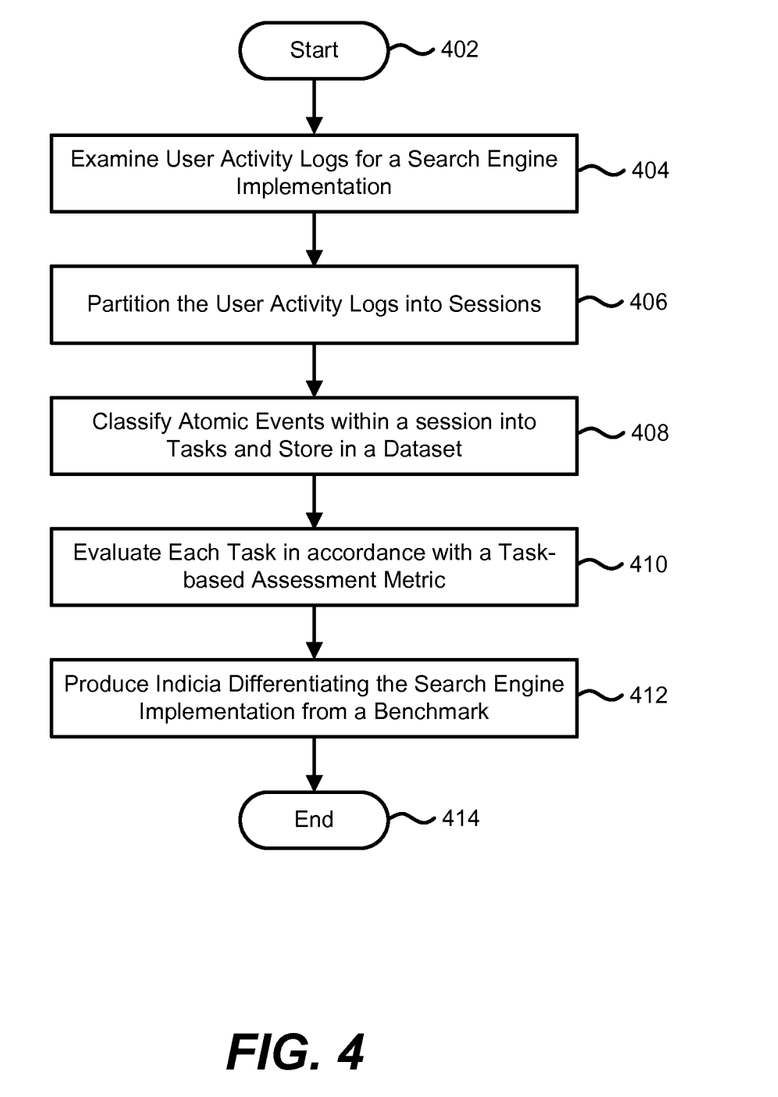
FIG. 4 is a flow diagram illustrating example steps for providing a task-based assessment metric for a search engine implementation according to one example implementation.

FIG. 4 is a flow diagram illustrating example steps for applying a task-based assessment metric to a search engine implementation according to one example implementation. In one implementation, the evaluation mechanism 102 of FIG. 1 may perform each and every step of FIG. 4. The example steps depicted in FIG. 4 commence at step 402 and proceed to step 404 at which user activity logs for a search engine implementation are examined. As described herein, the user activity logs represent search and browsing activity by an entire user population of a specific search engine implementation. In one implementation, the evaluation mechanism 102 selects a portion of the user activity logs to use as a sample of the user population for the purpose of assessing performance of the specific search engine implementation.

Step 406 represents a partitioning of the user activity logs into sessions. A component of the evaluation mechanism 102 known as an evaluation classifier (e.g., the evaluation classifier 112 of FIG. 1) may segment the sessions into time blocks according to a session cutoff time threshold (e.g., thirty minutes). Step 408 refers to classifying atomic events within a session into tasks and storing the atomic events in a dataset. The evaluation mechanism 102 uses various heuristics to measure similarities between queries and to compute weights for features that are used by the evaluation classifier to identify queries that belong to a same task based on a threshold similarity score.

Step 410 is directed to evaluating each task in accordance with a task-based assessment metric. In one implementation, the evaluation mechanism 102 determines a task success rate at a session level, a user level and a search engine implementation level or user activity log level. Step 412 is directed to producing indicia differentiating the search engine implementation from a (performance) benchmark. The evaluation mechanism 102 may generate distributions for each level and compare corresponding distributions for the benchmark or, alternatively, another search engine implementation with these distributions in order to determine indicia of performance in terms of user behavior, such as user satisfaction. Step 414 terminates the steps described in FIG. 4.

Figure 5:
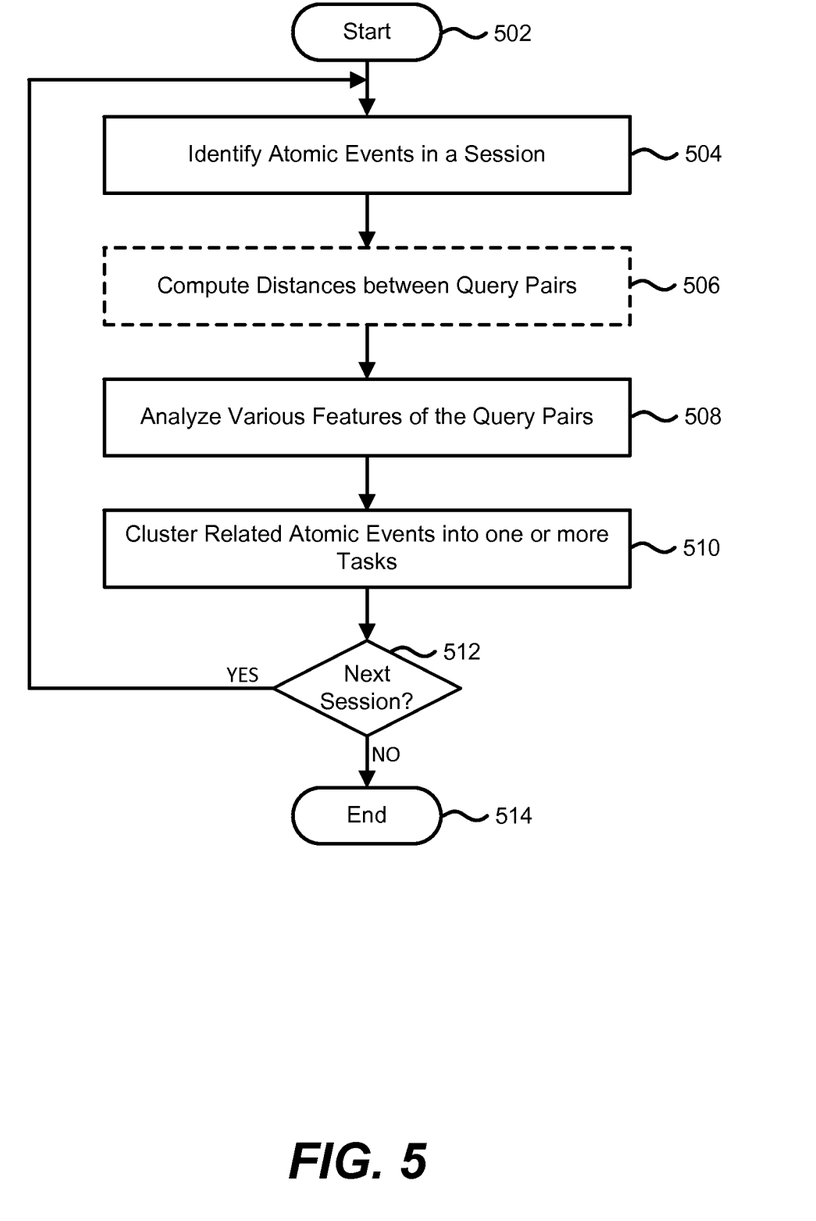
FIG. 5 is a flow diagram illustrating example steps for classifying atomic events into tasks according to one example implementation.

FIG. 5 is a flow diagram illustrating example steps for classifying atomic events into tasks according to one example implementation. In one implementation, the evaluation mechanism 102 of FIG. 1 may perform each and every step of FIG. 5. The example steps depicted in FIG. 5 commence at step 502 and proceed to step 504 where atomic events are identified. Step 506 is an optional step at which distances between query pairs are computing using heuristic functions. These distances refer to similarity measurements using different features and contexts as described herein.

Step 508 represents extracting and analyzing various features of the query pairs. Some of the various features may be based on semantic, edit distances, temporal and/or the like. Step 510 is directed to the clustering of related atomic events into one or more tasks. The evaluation classifier uses graph techniques to sort the atomic events by task. Step 512 determines whether there is a next session from which tasks are to be extracted. If there is a next session in a session trail, step 512 returns to step 504. If there are no more sessions, step 512 proceeds to step 514. Step 514 terminates the steps described in FIG. 5.

Figure 6:
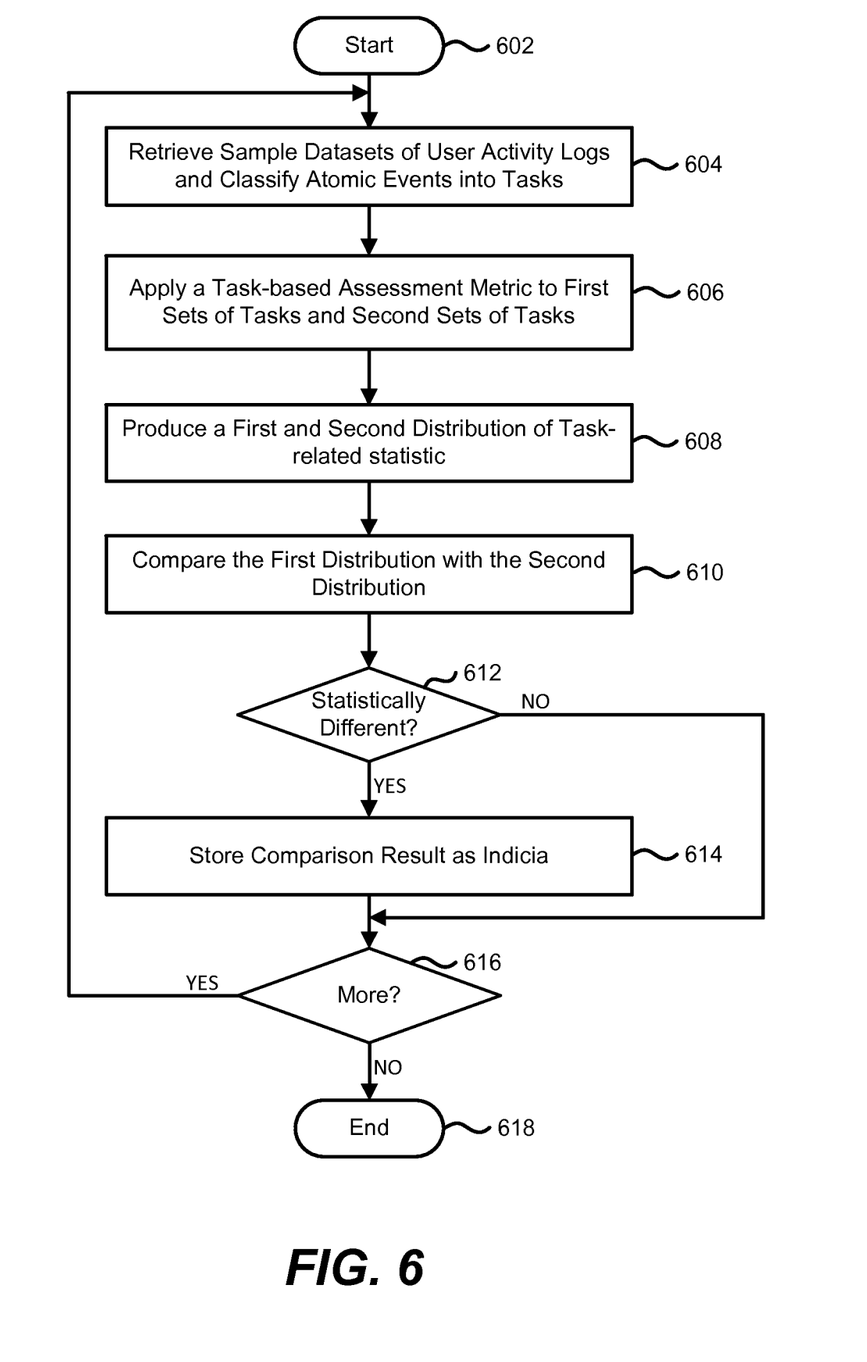
FIG. 6 is a flow diagram illustrating example steps for producing indicia differentiating search engine implementations in terms of user behavior according to one example implementation.

FIG. 6 is a flow diagram illustrating example steps for producing indicia differentiating search engine implementations in terms of user behavior according to one example implementation. In one implementation, the evaluation mechanism 102 of FIG. 1 may perform at least some steps of FIG. 6. The example steps depicted in FIG. 6 commence at step 602 and proceed to step 604 where sample datasets of user activity logs are retrieved and the atomic events are classified into tasks. For example, the atomic events may be grouped into first sets of tasks associated with a first search engine implementation and second sets of tasks associated with a second search engine implementation. Each set of tasks may correspond to a specific user. Step 606 refers to an application of a task-based assessment metric to the first sets of tasks for the first search engine implementation and the second sets of tasks for the second search engine implementation. Step 608 is directed to producing a first and second distribution of a task-related statistic, such as a task success rate or a task per user quantity.

Step 610 is directed to comparing the first distribution with the second distribution and generating a comparison result. In one implementation, the evaluation mechanism 102 computes a variance difference and/or a mean difference between the first and the second distributions, which are stored as the comparison result. Each of these differences may represent a performance difference. Step 612 is a determination as to whether the first distribution and the second distribution are statistically different. In one implementation, the evaluation mechanism 102 compares the performance difference with a significance level or critical p-value and determines whether the performance difference is statistically significant given the first and the second distributions. If the first and the second distributions are statistically different, step 612 proceeds to step 614. If the distributions are not statistically different, step 612 proceeds to step 616. Step 614 represents storing the comparison result as indicia of a performance difference between the first distribution and the second distribution that is statistically significant. Step 616 determines whether there are more sample datasets to test. If there are more samples, step 616 returns to step 604. If there are no more samples to test, step 616 proceeds to step 618 where the example steps end.

Figure 7:
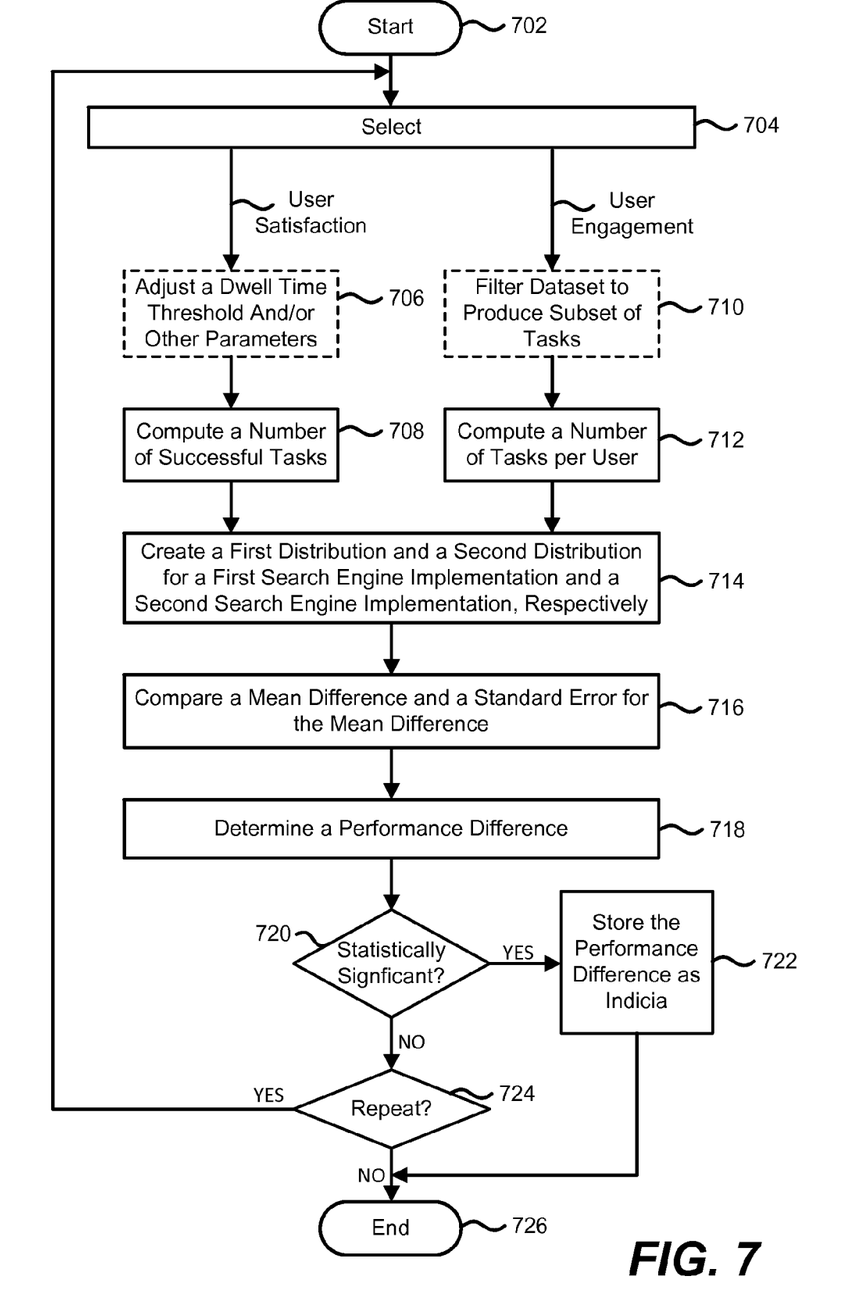
FIG. 7 is a flow diagram illustrating example steps for evaluating search engine performance based on user satisfaction and/or user engagement according to one example implementation.

FIG. 7 is a flow diagram illustrating example steps for evaluating search engine performance based on user satisfaction and/or user engagement according to one example implementation. In one implementation, the evaluation mechanism 102 of FIG. 1 may perform at least some of the steps of FIG. 7. The example steps depicted in FIG. 7 commence at step 702 and proceed to step 704 where a selection is provided as to which task-based assessment metric to use for evaluating tasks in terms of user behavior.

Step 706 and step 708 apply metrics for quantifying user satisfaction and step 710 and step 712 apply metrics for quantifying user engagement. If a metric for quantifying user satisfaction is selected, step 704 proceeds to optional step 706 or to step 708. Optional step 706 refers to adjusting a dwell time threshold and/or other parameters that affect task success rate. Step 708 refers to computing a number of successful tasks based on a current dwell time threshold. If a user dwells or examines a web page that originated from a query, the task is deemed a success. If a metric for quantifying user engagement is selected, step 704 proceeds to optional step 710 or step 712. Optional Step 710 refers to filtering a dataset to produce a subset of tasks. Step 712 refers to computing a number of tasks per user.

Step 714 is directed to creating a first distribution and a second distribution for a first search engine implementation and a second search engine implementation, respectively. Step 716 is directed to comparing a mean difference and a standard error for the mean difference. Step 718 is directed to determining a performance difference. In one implementation, the evaluation mechanism 102 computes a ratio indicating a performance difference between the first search engine implementation and the second search engine implementation. Step 720 determines whether the performance difference is statistically significant.

If the performance difference is statistically significant based on a significance level and p-value comparison, step 720 proceeds to step 722. Step 722 is directed to storing the performance difference as indicia. If the performance difference is not statistically significant based on the significance level and p-value comparison, step 720 proceeds to step 724. Step 724 determines whether to repeat the example steps for another dataset. If the example steps are to be repeated, step 724 returns to step 704. If the example steps are not to be repeated, step 724 proceeds to step 726. Step 726 terminates the example steps.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 8:
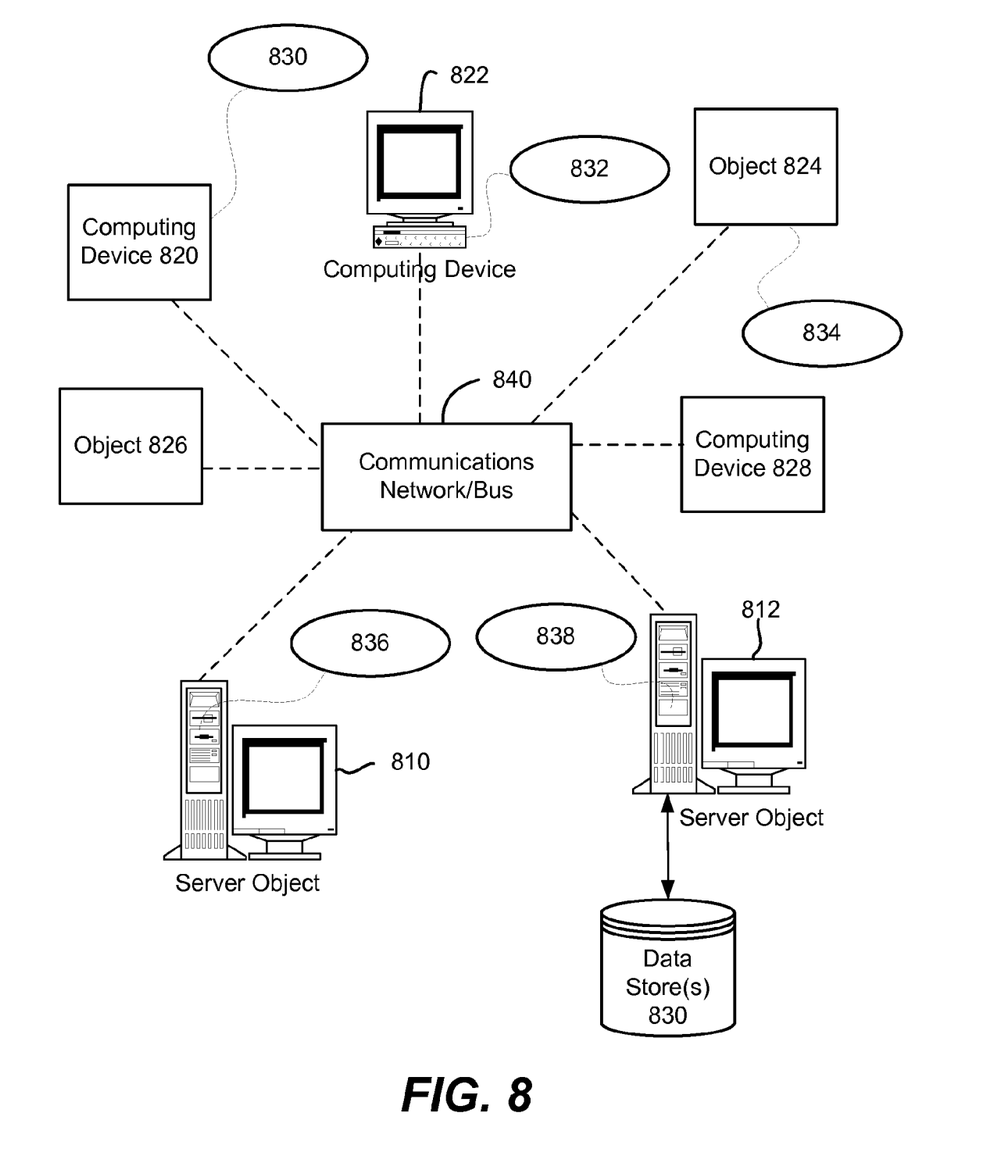
FIG. 8 is a block diagram representing example non-limiting networked environments in which various embodiments described herein can be implemented.

FIG. 8 provides a schematic diagram of an exemplary networked or distributed computing environment. The distributed computing environment comprises computing objects 810, 812, etc., and computing objects or devices 820, 822, 824, 826, 828, etc., which may include programs, methods, data stores, programmable logic, etc. as represented by example applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 may comprise other computing objects and computing devices that provide services to the system of FIG. 8, and/or may represent multiple interconnected networks, which are not shown. Each computing object 810, 812, etc. or computing object or device 820, 822, 824, 826, 828, etc. can also contain an application, such as applications 830, 832, 834, 836, 838, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc., acting as servers provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 840 or bus is the Internet, for example, the computing objects 810, 812, etc. can be Web servers with which other computing objects or devices 820, 822, 824, 826, 828, etc. communicate via any of a number of known protocols, such as the hypertext transfer protocol (HTTP). Computing objects 810, 812, etc. acting as servers may also serve as clients, e.g., computing objects or devices 820, 822, 824, 826, 828, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 9 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
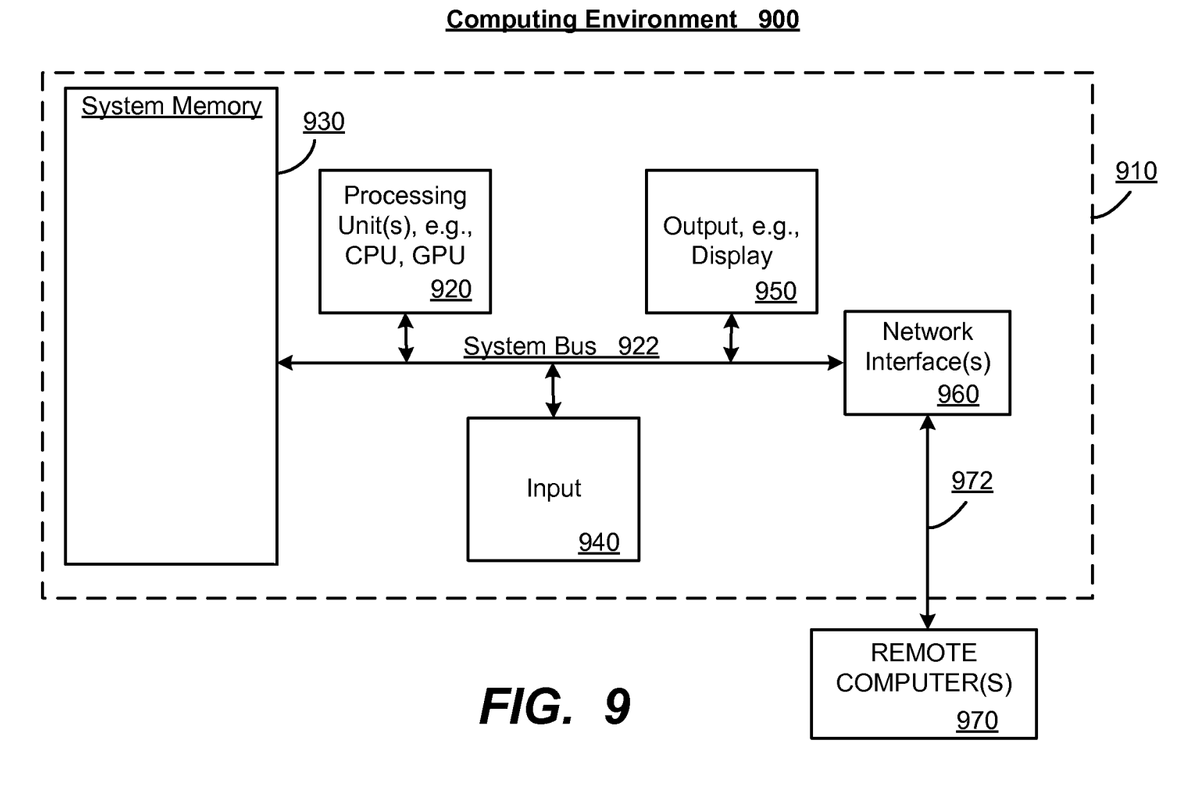
FIG. 9 is a block diagram representing an exemplary non-limiting computing system or operating environment in which one or more aspects of various embodiments described herein can be implemented.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. In addition, the computing system environment 900 is not intended to be interpreted as having any dependency relating to any one or combination of components illustrated in the exemplary computing system environment 900.

With reference to FIG. 9, an exemplary remote device for implementing one or more embodiments includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising,
   applying a task-based assessment metric to a search engine implementation, including,
   examining user activities associated with the search engine implementation,
   classifying atomic events into tasks by measuring similarity between at least some of the user activities, and
   evaluating each task in accordance with the task-based assessment metric to determine indicia of search engine implementation performance comprising a task success rate for the search engine implementation, including applying the task-based assessment metric to the tasks to produce a statistical distribution and comparing the statistical distribution corresponding to the search engine implementation with a distribution corresponding to another search engine implementation to generate a comparison result.

2. The method of claim 1, wherein evaluating the each task further comprises computing the task success rate for the search engine implementation.

3. The method of claim 2, wherein computing the number of successful tasks further comprises establishing a dwell time threshold associated with identifying a successful task.

4. The method of claim 1, wherein evaluating the each task further comprises computing a number of tasks per user for the search engine implementation.

5. The method of claim 1, wherein classifying the atomic events further comprises identifying a first task and a second task that are interleaved.

6. The method of claim 1, wherein evaluating the each task further comprising filtering the tasks to produce a subset of tasks.

7. The method of claim 6, wherein evaluating the each task further comprising applying the task-based assessment metric to the subset of tasks to produce a performance difference between different search engine implementations.

8. The method of claim 1, wherein evaluating the each task further comprises producing information differentiating the search engine implementation from a performance benchmark.

9. The method of claim 1, wherein evaluating the each task further comprises applying the task-based assessment metric to sample datasets from user activity logs to produce a first distribution and a second distribution corresponding to the tasks performed by a first search engine implementation and a second search engine implementation, respectively, and comparing the first distribution and the second distribution to generate a comparison result.

10. The method of claim 9, further comprising determining that the first distribution and the second distribution are statistically different based on the comparison result.

11. The method of claim 9, further comprising comparing a mean difference associated with the first distribution and the second distribution with a standard error of the mean difference to compute a ratio indicating a performance difference, based on at least one of user satisfaction and user engagement, between the first search engine implementation and the second search engine implementation.

12. The method of claim 11 further comprising determining whether the performance difference between the first search engine implementation and the second search engine implementation is statistically significant.

13. In a computing environment, a system, comprising,
   at least one processor,
   a memory communicatively coupled to the at least one processor and including components comprising,
   an evaluation mechanism configured to run on the at least one processor and compare a first search engine implementation with the second search engine implementation using a task-based assessment metric,
   wherein the evaluation mechanism is further configured to extract first sets of tasks from a dataset comprising samples of user activity logs for the first search engine implementation and second sets of tasks from another dataset comprising samples of user activity logs for the second search engine implementation, to compute a first task success rate for each of the first sets of tasks and a second task success rate for each of the second sets of tasks, to apply the task-based assessment metric to the first sets of tasks and the second sets of tasks to produce a first distribution and a second distribution, respectively, and to compare the first distribution and the second distribution to determine indicia of a performance difference between the first search engine implementation and the second search engine implementation in terms of user behavior.

14. The system of claim 13, wherein the evaluation mechanism is further configured to compute a first task per user quantity for each of the first sets of tasks and a second task per user quantity for each of the second sets of tasks.

15. The system of claim 13, wherein the dataset and the other dataset comprise search histories and browsing histories.

16. The system of claim 13, wherein the evaluation mechanism is further configured to determine that the performance difference is statistically significant based on a test statistic.

17. The system of claim 13 further comprising an evaluation classifier configured to identify one or more first queries associated with each task of the first sets of tasks and one or more second queries associated with each task of the second set of tasks.

18. One or more computer-readable storage units having computer-executable instructions, which when executed perform steps, comprising:
classifying atomic events into tasks corresponding to user activities associated with a search engine implementation;
selecting at least one of a user satisfaction metric or a user engagement metric for assessing a performance of the search engine implementation with respect to the tasks; and
differentiating the performance of the search engine implementation from a benchmark associated with standard search engine implementation performance, including applying the at least one of a user satisfaction metric or a user engagement metric to the tasks to produce a task-based statistical distribution, comparing the task-based statistical distribution with the benchmark to compute a test statistic, and based upon the test statistic, determining whether a performance difference between the search engine implementation and the benchmark is statistically significant.

19. The one or more computer-readable storage units of claim 18 having further computer-executable instructions comprising: comparing the test statistic with a significance level to generate a comparison result; and determining whether the task-based statistical distribution is statistically significant departure from the benchmark.

* * * * *